United States Patent Office.

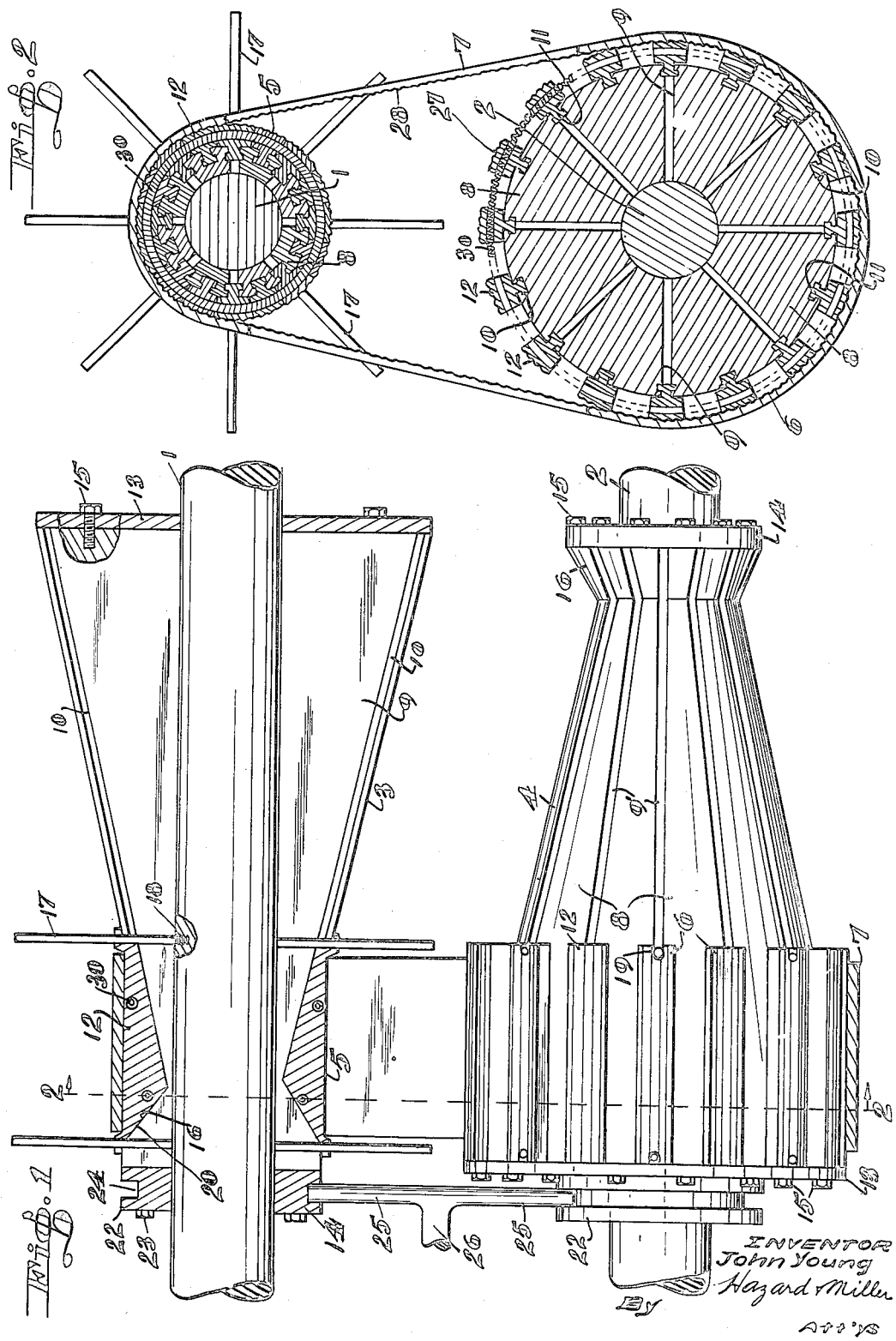

JOHN YOUNG, OF MOUNT VERNON, NEW YORK.

VARIABLE-SPEED TRANSMISSION.

1,379,504. Specification of Letters Patent. Patented May 24, 1921.

Application filed May 20, 1920. Serial No. 382,734.

*To all whom it may concern:*

Be it known that I, JOHN YOUNG, a citizen of the United States, residing at Mount Vernon, in the county of Westchester, State of New York, have invented new and useful Improvements in Variable-Speed Transmissions, of which the following is a specification.

This invention is a variable speed transmission arranged to provide means for producing variable speeds during a continuous application of power.

The invention will be readily understood from the following description of the accompanying drawings, in which—

Figure 1 is a side elevation of the improved transmission partly in longitudinal section.

Fig. 2 is a transverse section on the line 2—2 of Fig. 1.

The improved transmission is shown as adapted to transmit power from one of two parallel shafts to the other, these shafts being shown at 1 and 2 as a drive shaft and a driven shaft respectively. The improved transmission contemplates the employment of cones 3 and 4 upon the shafts 1 and 2 respectively, these cones being of the same size and reversely arranged upon the shafts 1 and 2 so that the base of one cone is opposite the apex of the other cone. The cones are arranged to be simultaneously shifted lengthwise of the shafts 1 and 2, so as to simultaneously expand and contract belt engaging rings 5 and 6 fixed against longitudinal and rotary movement upon shafts 1 and 2 respectively. A drive belt 7 is received around the two belt engaging rings for providing a driving connection from shaft 1 to shaft 2.

By this arrangement it will be seen that as the cones are simultaneously shifted along shafts 1 and 2, one of the belt engaging rings will be either expanded or contracted by the contact of the conical surface of one of the cones against the inner surface of said belt engaging ring, and at the same time the other belt engaging ring will be proportionately contracted or expanded. The distance between the outer surfaces of the belt engaging rings will thus remain constant, so that the drive belt 7 will maintain a tight frictional driving contact with said rings, but the diameter of the drive belt engaging ring will vary proportionately to the diameter of the driven belt engaging ring as cones 3 and 4 are longitudinally moved to expand and contract the belt engaging rings and the ratio of speed between the drive and driven shafts may thus be varied at will.

Referring more particularly to the specific embodiment of the invention as illustrated, each of the cones 3 and 4 is shown as comprising a plurality of sectors of a cone as shown at 8. These sectors are, preferably, separated by grooves 9 extending from the shaft upon which the cone is mounted to the outer surface of said cone, and grooves 9' are, preferably, provided at the periphery of sectors 8 midway between grooves 9. A transverse groove 10 is provided in each of the grooves 9 and 9' adjacent their outer ends to receive a cross head 11 depending from each of the sections 12 into which each of the belt engaging rings 5 and 6 are divided. By this arrangement it will be seen that the cones are free to slide along the drive and driven shafts relative to the belt engaging rings, the sections of the latter being fixed for rotation with the cones by engagement of cross heads 11 in grooves 10, and said sections being also free for radial movement to contract and expand the belt engaging rings circumferentially as will be readily understood by reference to the respective belt engaging rings 5 and 6 as seen in Fig. 2. The apex ends of the cone sections are, preferably, outwardly flared as shown at 16 to provide stops for preventing longitudinal movement of the cones beyond the belt engaging rings. The sectors of the respective cones may be secured together in spaced relation so as to provide grooves 9 by end plates 13 and 14 suitably bolted, as shown at 15, to the bases of the cone sections and to the apexes of the cone sections respectively.

The belt engaging rings may be fixed against longitudinal and rotary movement relative to the drive and driven shafts by pins 17 secured in shafts 1 and 2 as shown by threaded connections 18 and projecting radially therefrom, through the respective grooves 9, preferably, adjacent the respective ends of the sections of the belt engaging rings. These pins extend through suitable radial notches 19 provided in the ends of the sections of the belt engaging rings, whereby abutment of said pins against the walls of said notches will cause fixed rotary movement of the sections of the belt engaging rings with the drive and driven shafts. At the same time, it will be understood that the sections of the belt engaging rings are free for radial movement relative to the shafts along the pins 17 to expand and contract the belt engaging rings. The inner ends of sections 12, are preferably, inclined parallel to the conical surfaces of cone sections 8 as clearly shown in Fig. 1, and the ends of said sections adjacent the apex ends of the cones are, preferably, inclined as shown at 20, so as to abut against the enlarged ends 16 of the cones for limiting the movement of the cones relative to the belt engaging rings. The sections of the belt engaging rings are, preferably, yieldably held together by circumferential springs 30 extending through the respective ring sections.

The mechanism employed for simultaneously shifting the cones 3 and 4 may comprise sleeves 22 secured to adjacent ends of cones 3 and 4, as by bolts 23. Circumferential grooves 24 are provided in these sleeves, in which are received the arms 25 of a yoke 26, arranged to be longitudinally shifted in any well known or desired manner for simultaneously shifting sleeves 22 and the cones secured thereto, longitudinally along the drive and driven shafts.

The drive connection between the sections of the belt engaging rings and the belt 7 is, preferably, a frictional drive connection, and in order to form intimate frictional engagement between sections 12 and the belt 7, the belt engaging surfaces of sections 12 may be corrugated as shown at 27, and the contact surface of belt 7 is, preferably, similarly corrugated, as shown at 28, to prevent slipping between the coöperating contact surfaces of the belt and the belt engaging rings.

By this arrangement as thus described, it will be seen that the belt engaging rings are fixed by pins 17 against longitudinal and rotary movement relative to the drive and driven shafts, but are free to be proportionately expanded and contracted to change the speed ratio between the two shafts through longitudinal movement of the cones 3 and 4.

A variable speed transmission is thus provided by means of which power is continuously applied from the drive to the driven shaft during changing of the speed ratio.

It will be apparent that various changes may be made in the construction as thus described without departing from the spirit of the invention.

What is claimed is:

1. A variable speed transmission comprising conical members arranged side by side with their apexes extending in opposite directions; arcuate members mounted upon and projecting beyond said conical members to form expansible rings; resilient members extending circumferentially of said rings and through said arcuate sections so as to permit of circumferential expansion and contraction of said rings; a driving connection between said expansible rings; and means for jointly moving said conical members lengthwise of said expansible rings for proportionately expanding and contracting the respective rings.

2. A variable speed transmission comprising parallel shafts; conical members upon said shafts and arranged for longitudinal movement along the same; pins projecting radially from said shafts; expansible rings carried by said pins and surrounding said conical members, said expansible rings being fixed against rotation relative to said shafts by said pins and being free for radial movement relative to said pins to expand and contract said rings; a driving connection between said expansible rings; and means for jointly shifting said conical members lengthwise of said shafts for proportionately expanding and contracting the respective expansible rings.

3. A variable speed transmission comprising parallel shafts; conical members on said shafts, each comprising a plurality of sectors having longitudinal grooves between the same; pins projecting radially from said shafts through said grooves to permit of longitudinal movement of said conical members along said shafts; expansible rings supported by said pins and surrounding said conical members, said expansible rings being fixed against rotation relative to said shafts and being free for radial expansion and contraction relative to said shafts; a driving connection between said expansible rings; and means for jointly shifting said conical members along said shafts for expanding and contracting the respective expansible rings.

4. A variable speed transmission comprising parallel shafts; conical members upon said shafts, each comprising a plurality of sectors separated by longitudinal grooves; pins extending radially from said shafts through said grooves; expansible rings surrounding the conical members and each comprising a plurality of sectors supported respectively by said pins, so as to prevent rotary movement of said sections relative to said shafts, and so as to permit of radial movement of said sections along said pins for expanding and contracting the expansible rings; cross heads upon the ring sections received in the grooves of said conical members and arranged to cause radial expansion and contraction of said expansible rings by longitudinal movement of said conical members relative to said sections; a driving belt received around said expansible rings; and means for jointly shifting said conical members along said shaft for expanding and contracting the respective expansible rings.

In testimony whereof I have signed my name to this specification.

JOHN YOUNG.